US009394973B1

(12) United States Patent
Theobald

(10) Patent No.: US 9,394,973 B1
(45) Date of Patent: Jul. 19, 2016

(54) METHODS AND SYSTEMS FOR SHIFTING GEARS OF A TRANSMISSION

(71) Applicant: Daniel Theobald, Somerville, MA (US)

(72) Inventor: Daniel Theobald, Somerville, MA (US)

(*) Notice: Subject to any disclaimer, the term of this patent is extended or adjusted under 35 U.S.C. 154(b) by 0 days.

(21) Appl. No.: 14/143,014

(22) Filed: Dec. 30, 2013

(51) Int. Cl.
*B60W 10/04* (2006.01)
*B60W 10/10* (2012.01)
*F16H 3/12* (2006.01)

(52) U.S. Cl.
CPC .......................... *F16H 3/12* (2013.01)

(58) Field of Classification Search
None
See application file for complete search history.

(56) References Cited

U.S. PATENT DOCUMENTS

| | | | | |
|---|---|---|---|---|
| 3,834,499 | A * | 9/1974 | Candellero et al. | 477/73 |
| 3,921,469 | A * | 11/1975 | Richards | 74/339 |
| 5,827,148 | A * | 10/1998 | Seto | B60L 11/18 477/15 |
| 6,123,642 | A * | 9/2000 | Saito et al. | 477/3 |
| 8,417,427 | B2 * | 4/2013 | Stridsberg | 701/51 |
| 2007/0250237 | A1 * | 10/2007 | Zak | 701/51 |
| 2010/0114441 | A1 * | 5/2010 | Liu et al. | 701/54 |
| 2011/0106360 | A1 * | 5/2011 | Wu | B60K 1/00 701/22 |

* cited by examiner

*Primary Examiner* — Edwin A Young
(74) *Attorney, Agent, or Firm* — Albert J. Brunett

(57) ABSTRACT

Methods and systems are provided that involve or include a transmission. During one of the methods, a motor is operated based on speed data to synchronize a first rotor of the transmission with a second rotor of the transmission, where the speed data is indicative of speeds of the first and the second rotors. The synchronized first and second rotors are engaged with one another to transfer torque from the motor to the output.

17 Claims, 8 Drawing Sheets

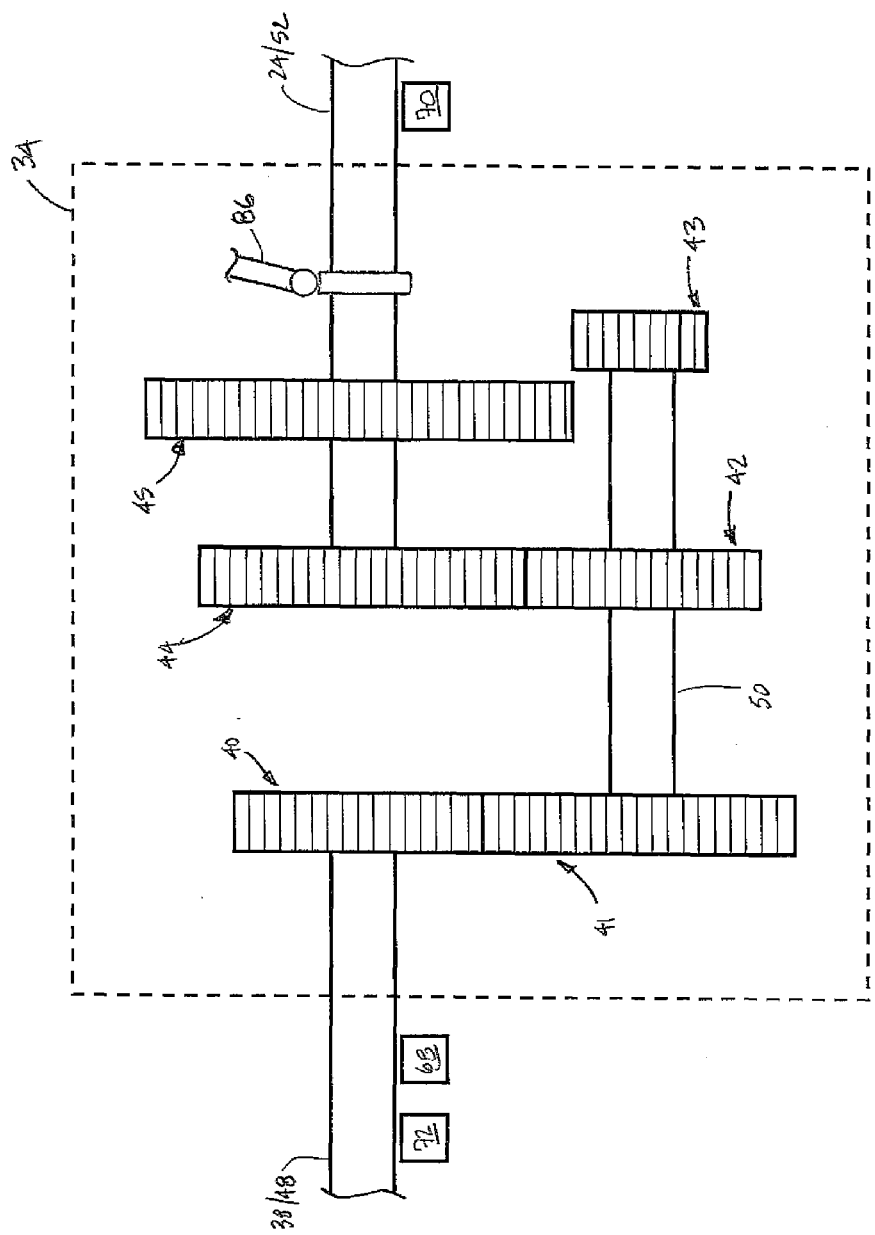

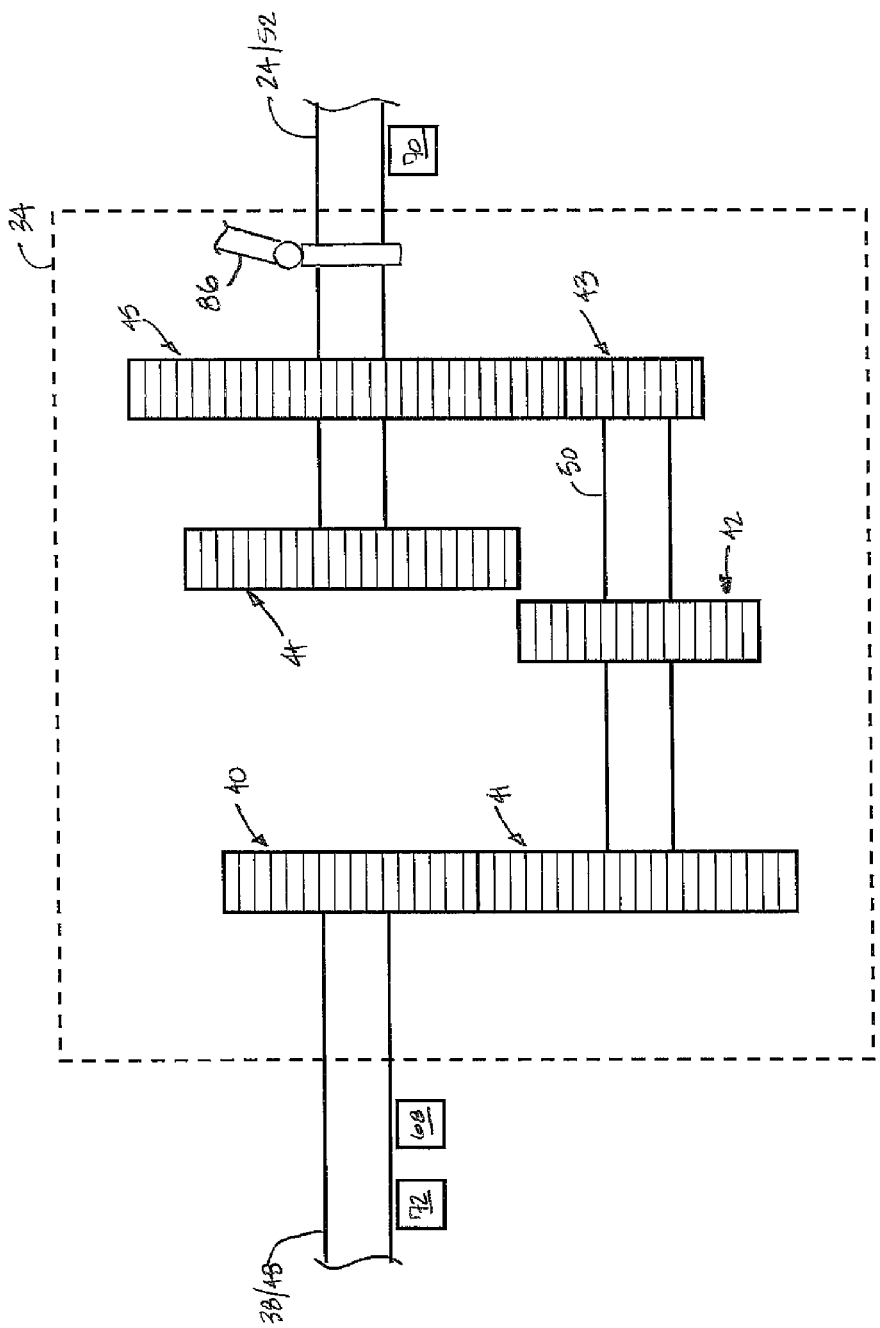

METHODS AND SYSTEMS FOR SHIFTING GEARS OF A TRANSMISSION

BACKGROUND OF THE INVENTION

1. Technical Field

The present invention relates generally to a transmission and, more particularly, to methods and systems for shifting gears of a transmission.

2. Background Information

A modern automobile typically includes a transmission that transfers mechanical energy from a motor to components of a drive train. A modern automobile also typically includes at least one clutch and/or a torque converter, which allows the transmission to shift gears without damaging the gears as they engage or disengage one another. Such a clutch and/or torque converter, however, may increase the complexity, cost, weight and size of the automobile.

There is a need in the art for improved methods and systems for shifting gears of a transmission.

SUMMARY OF THE DISCLOSURE

Methods and systems are provided that involve or include a shiftable transmission. During a first of the methods, a motor is operated based on speed data to synchronize a first rotor (e.g., a gear) of the transmission with a second rotor (e.g., another gear) of the transmission, where the speed data is indicative of speeds of the first and the second rotors. The synchronized first and second rotors are engaged with one another to transfer torque from the motor to the output. During a second of the methods, the motor is operated based on torque data to substantially unload the first rotor, where the torque data is indicative of a torque to which the first rotor is subjected. The unloaded first rotor is disengaged from the second rotor to decouple the motor from the output.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

FIG. 7 is a block diagram of the sensors with another alternate embodiment transmission in first gear; and FIG. 8 is a block diagram of the sensors with the transmission of FIG. 7 in second gear.

DETAILED DESCRIPTION

Figure 1:
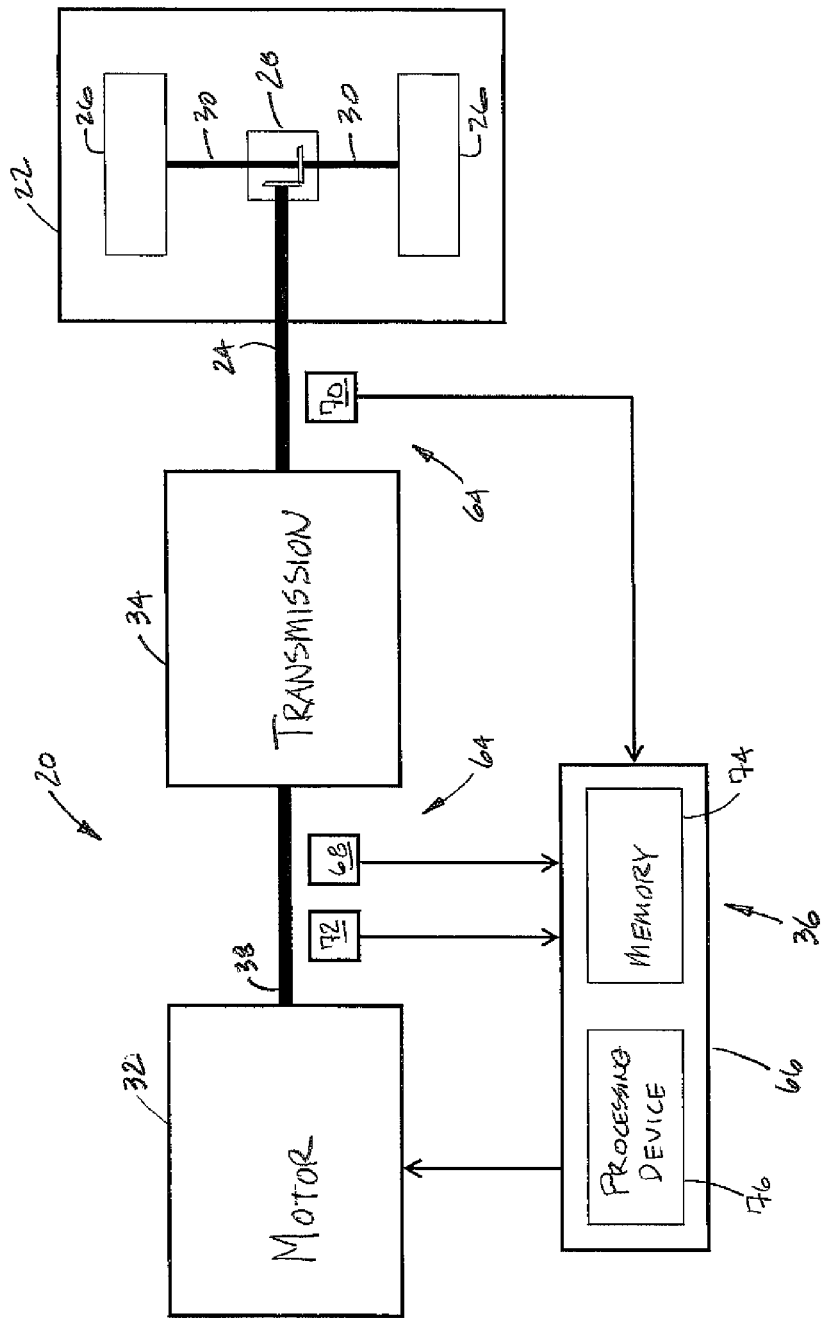
FIG. 1 is a block diagram of a power system configured with a load.

FIG. 1 illustrates a power system 20 configured with a load 22. The power system 20 and/or the load 22 may be included in a land, water and/or air based vehicle such as, for example, an automobile, a truck, a motorcycle, a train, a tractor, a ship, a submarine, an aircraft, or a space craft. Alternatively, the power system 20 and/or the load 22 may be included in an autonomous mobile robot, a crane, a conveyor system, or any other type of consumer, industrial and/or military equipment. For ease of description, however, the power system 20 and the load 22 of FIG. 1 are described below as being included in an automobile, which may be an electric automobile, a hybrid automobile or a gasoline/diesel powered automobile.

The load 22 is connected to the power system 20 by a shaft 24, or any other type of power transfer device(s). The load 22 may be configured as or otherwise include one or more components of a drive train for the automobile. The load 22, for example, may include one or more drive wheels 26 that are connected to the shaft 24 through a differential assembly 28 and one or more axles 30. In other embodiments, however, the load 22 may be configured as or otherwise include a propeller, a winch, a pump, an electric generator, or any other device(s) that may be mechanically powered (e.g., driven) by the power system 20.

The power system 20 includes a motor 32, a transmission 34 and a control system 36. The motor 32 may be configured as an electric motor that converts electrical energy into mechanical energy; e.g., torque. The electric motor may receive the electrical energy from a power storage device such as a battery. The electric motor may also or alternatively receive the electrical energy from a generator that may include, for example, one or more fuel cells and/or one or more solar panels, each of which may include an array of solar photovoltaic cells. Alternatively, the motor 32 may be configured as an internal combustion engine or a gas turbine engine that converts chemical energy into mechanical energy. Still alternatively, the motor 32 may be configured as a steam, hydraulic or pneumatic system that converts fluid energy to mechanical energy. The present invention, however, is not limited to any particular motor types or configurations.

The transmission 34 is connected to the motor 32 by a shaft 38, or any other type of power transfer device(s). The transmission 34 is connected to the load 22 by the shaft 24, or any other type of power transfer device(s).

Figure 2:
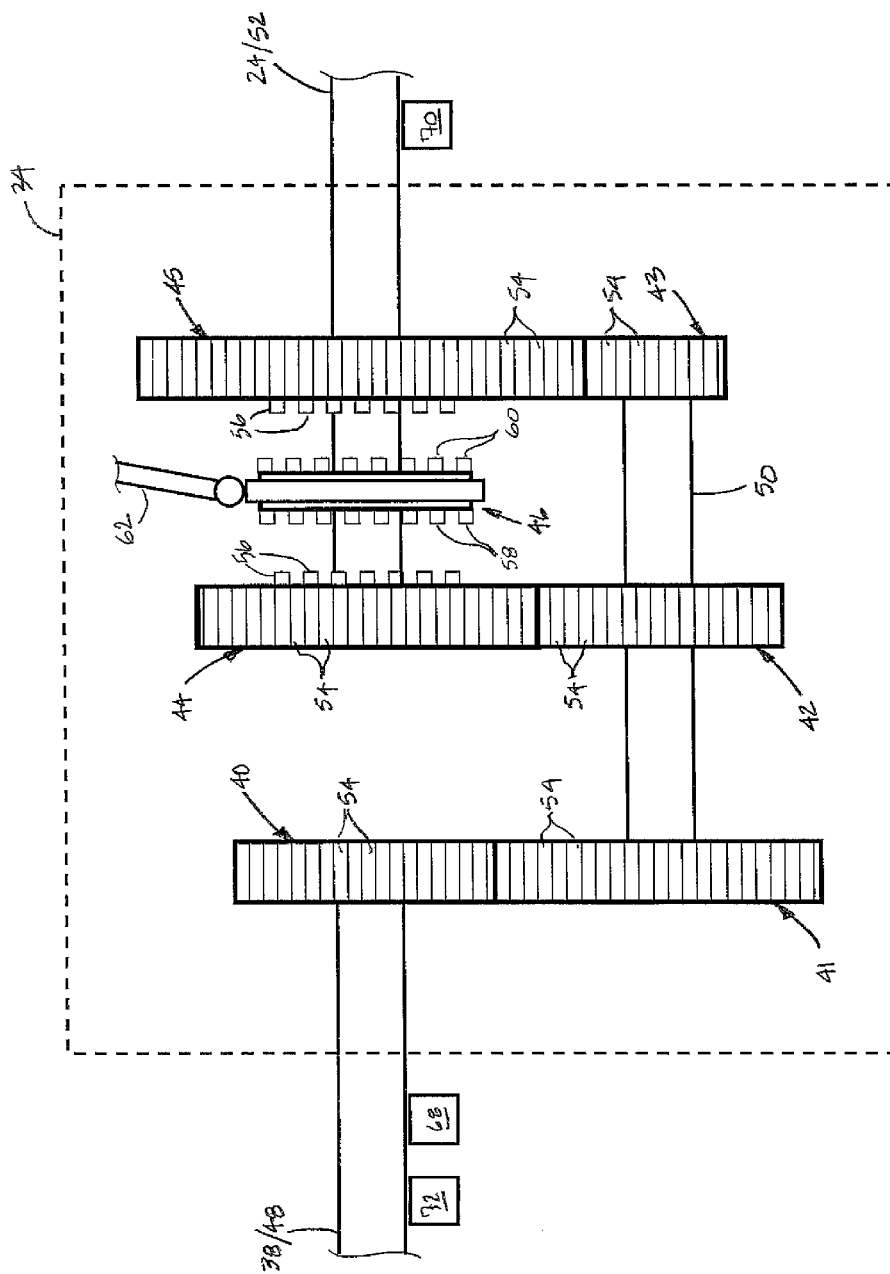
FIG. 2 is a block diagram of sensors with a transmission in neutral.
Figure 3:
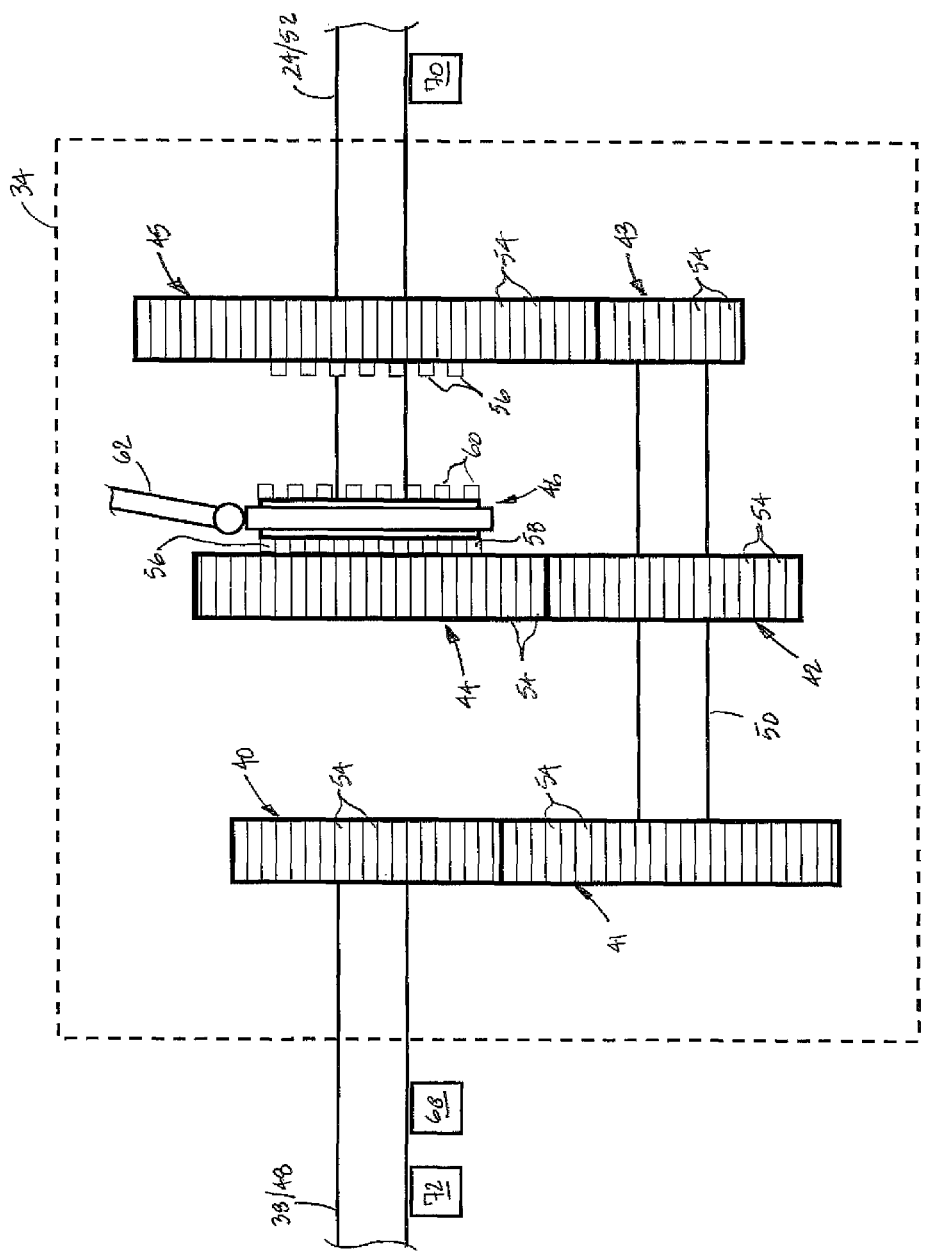
FIG. 3 is a block diagram of the sensors with the transmission of FIG. 2 in first gear.
Figure 4:
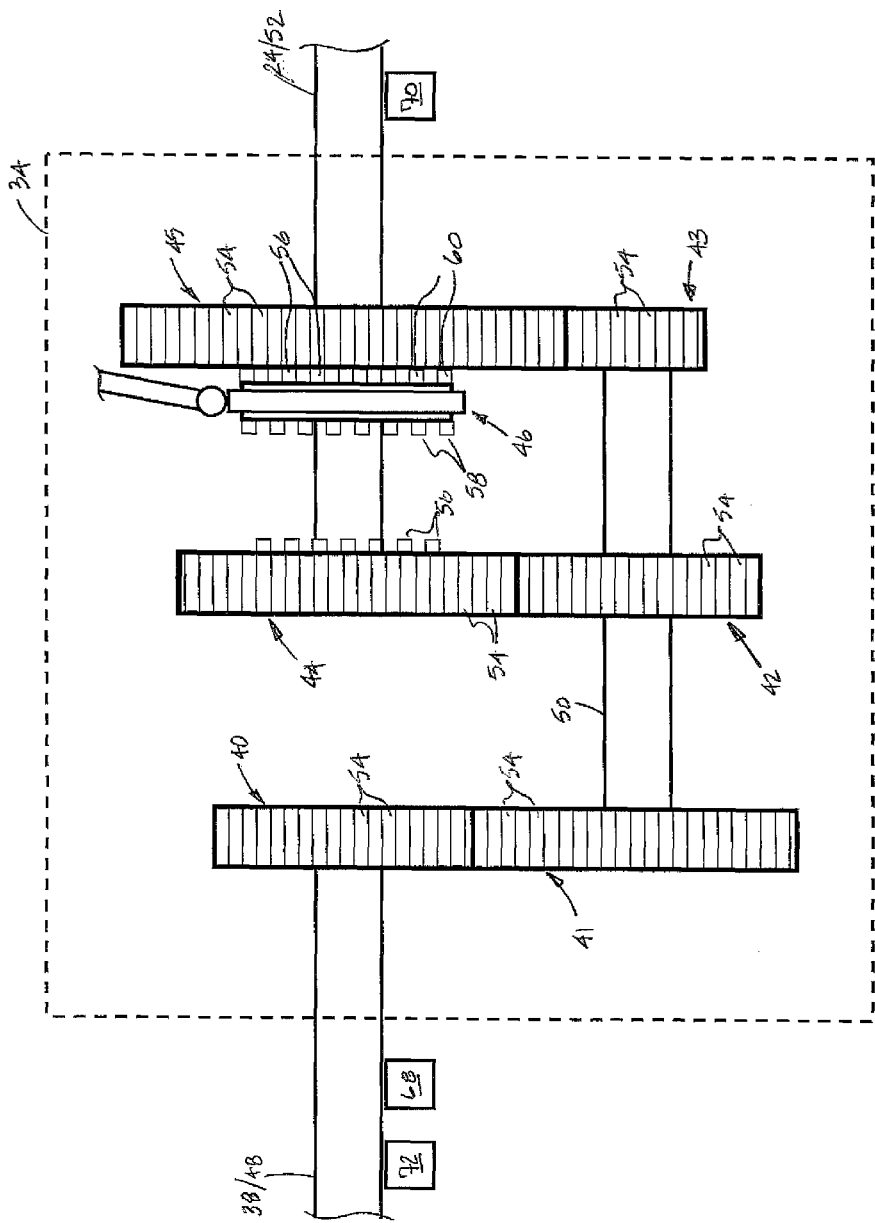
FIG. 4 is a block diagram of the sensors with the transmission of FIG. 2 in second gear.

FIGS. 2-4 illustrate an exemplary embodiment of the transmission 34. The transmission 34 is configured to selectively transfer mechanical energy (e.g., torque) from the motor 32 to the load 22 (see FIG. 1). The transmission 34 includes a plurality of gears 40-46 (e.g., rotors), an input shaft 48 (e.g., an input), a lay shaft 50 and an output shaft 52 (e.g., an output).

One or more of the gears 40-45 may each be configured as a spur gear, or a helical gear. Each gear 40-45 of FIGS. 2-4, for example, includes a plurality of teeth 54 arranged around and connected to a circumferential periphery of a circular gear body. One of more of the gears 44 and 45 may also each be configured as a crown-type gear. Each gear 44 and 45 of FIGS. 2-4, for example, includes a plurality of additional teeth 56 (or grooves) arranged around an axis of the gear body, and connected to (or extending into) a side of the gear body.

The gear 46 may be configured as a crown-type gear. The gear 46 of FIGS. 2-4, for example, includes a plurality of teeth 58 (or grooves) arranged around an axis of a gear body, and connected to (or extending into) a side of the gear body. The gear 46 also includes a plurality of additional teeth 60 (or grooves) arranged around the axis, and connected to (or extending into) another opposite side of the gear body.

The gear 40 is mounted on as well as axially and rotatably fixed to the input shaft 48. Each of the gears 41-43 is mounted on as well as axially and rotatably fixed to the lay shaft 50. Each of the gears 44 and 45 is rotatably mounted on and axially fixed to the output shaft 52. A bushing or a bearing, for example, may be disposed between each respective gear 44, 45 and the output shaft 52, which allows the gear 44, 45 to rotate relative to the output shaft 52. One or more of the teeth 54 of the gear 40 are meshed with one or more of the teeth 54 of the gear 41. One or more of the teeth 54 of the gear 42 are meshed with one or more of the teeth 54 of the gear 44. One or more of the teeth 54 of the gear 43 are meshed with one or more of the teeth 54 of the gear 45.

The gear 46 is slidably mounted on and rotatably fixed to the output shaft 52 between the gears 44 and 45. The gear 46, for example, may be further configured as a collar that mates with axially extending splines on the output shaft 52. In this manner, a shift linkage 62 may slide the gear along the output shaft 52 to various positions including: a neutral position (see FIG. 2), a first engaged position (see FIG. 3), and a second engaged position (see FIG. 4).

In the neutral position of FIG. 2, the transmission 34 may be referred to as being "out-of-gear" or "in neutral". The gear 46, for example, is located about midway between and does not contact the gears 44 and 45. The input shaft 48 and the lay shaft 50 therefore may rotate without rotating the output shaft 52. Thus, in the neutral position, the transmission 34 does not transfer mechanical energy from the motor 32 to the load 22.

In the first engaged position of FIG. 3, the transmission 34 may be referred to as being "in-gear"; e.g., in first gear. The gear 46, for example, axially engages the gear 44. More particularly, the teeth 58 of the gear 46 are meshed with the teeth 56 of the gear 44. Rotation of the input shaft 48 and the lay shaft 50 therefore may rotate the output shaft 52 at a first rotational speed. Thus, in the first engaged position, the transmission 34 transfers mechanical energy from the motor 32 to the load 22.

In the second engaged position of FIG. 4, the transmission 34 may also be referred to as being "in-gear"; e.g., in second gear. The gear 46, for example, axially engages the gear 45. More particularly, the teeth 60 of the gear 46 are meshed with the teeth 56 of the gear 45. Rotation of the input shaft 48 and the lay shaft 50 therefore may rotate the output shaft 52 at a second rotational speed that is different (e.g., faster) than the first rotational speed. Thus, in the second engaged position, the transmission 34 transfers mechanical energy from the motor 32 to the load 22.

Referring again to FIG. 1, the control system 36 includes a sensor system 64 and a controller 66. The sensor system 64 includes an input speed sensor 68, an output speed sensor 70 and a torque sensor 72. Each of these sensors 68, 70 and 72 may be configured as a contact sensor (e.g., an electro-mechanical sensor), or alternatively a non-contact sensor (e.g., a laser or proximity sensor).

Referring to FIG. 2, the input speed sensor 68 is arranged adjacent and contacts (or may be proximate) the input shaft 48. The input speed sensor 68 is configured to monitor rotation of the input shaft 48. The input speed sensor 68 is also configured to generate input speed data indicative of, for example, the rotational and/or tangential speeds of the input shaft 48. In addition, since the lay shaft 50 and the gears 40-45 turn with the input shaft 48, the input speed data is also indicative of the rotational and/or tangential speeds of the lay shaft 50 and the gears 40-45. Of course, in other embodiments, the input speed sensor 68 may alternatively be configured to directly monitor and generate data indicative of the rotational and/or tangential speeds of the lay shaft 50 or one of the gears 40-45.

The output speed sensor 70 is arranged adjacent and contacts (or may be proximate) the output shaft 52. The output speed sensor 70 is configured to monitor rotation of the output shaft 52. The output speed sensor 70 is also configured to generate output speed data indicative of, for example, the rotational and/or tangential speeds of the output shaft 52. In addition, since the gear 46 turns with the output shaft 52, the output speed data is also indicative of the rotational and/or tangential speeds of the gear 46. Of course, in other embodiments, the output speed sensor 70 may alternatively be configured to directly monitor and generate data indicative of the rotational and/or tangential speeds of the gear 46.

The torque sensor 72 is arranged adjacent and contacts (or may be proximate) the input shaft 48. The torque sensor 72 may be configured as a load cell that may monitor stress and/or strain on or within the input shaft 48. Based on the monitored stress and/or strain, the torque sensor 72 is also configured to generate torque data indicative of, for example, a torque to which the input shaft 48 is subjected. In addition, since the lay shaft 50 and the gears 40-45 turn with the input shaft 48, the torque data is also indicative of the torques to which the lay shaft 50 and the gears 40-45 are subjected. Of course, in other embodiments, the torque sensor 72 may alternatively be configured to directly monitor and generate data indicative of the torque to which the lay shaft 50 or one of the gears 40-45 is subjected.

Referring to FIG. 1, the controller 66 is in signal communication (e.g., hardwired or wirelessly connected) with the sensor system 64 and, more particularly, each of the sensors 68, 70 and 72. The controller 66 is also in signal communication with one or more actuators that control operation of the motor 32.

The controller 66 may be implemented using a combination of hardware and software. The hardware may include memory 74 and a processing device 76, which includes one or more single-core and/or multi-core processors. The hardware, of course, may also or alternatively include analog and/or digital circuitry other than that described above.

The memory 74 is configured to store software (e.g., program instructions) for execution of one or more methods, such as that described below, by the controller 66 and the processing device 76. The memory 74 may be a non-transitory computer readable medium. The memory 74 may include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 5:
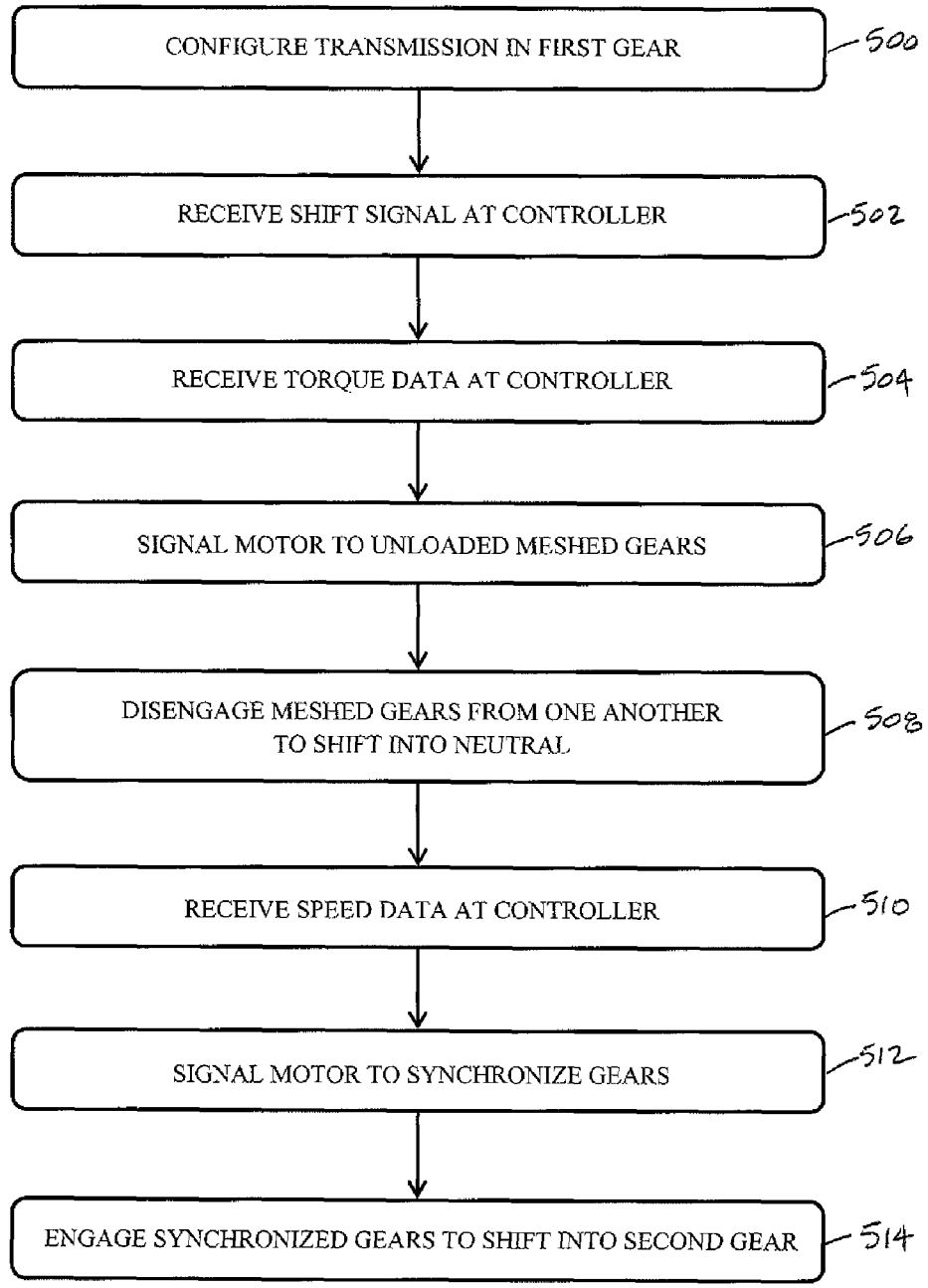
FIG. 5 is a flow diagram of a method involving the power system of FIG. 1.
Figure 6:
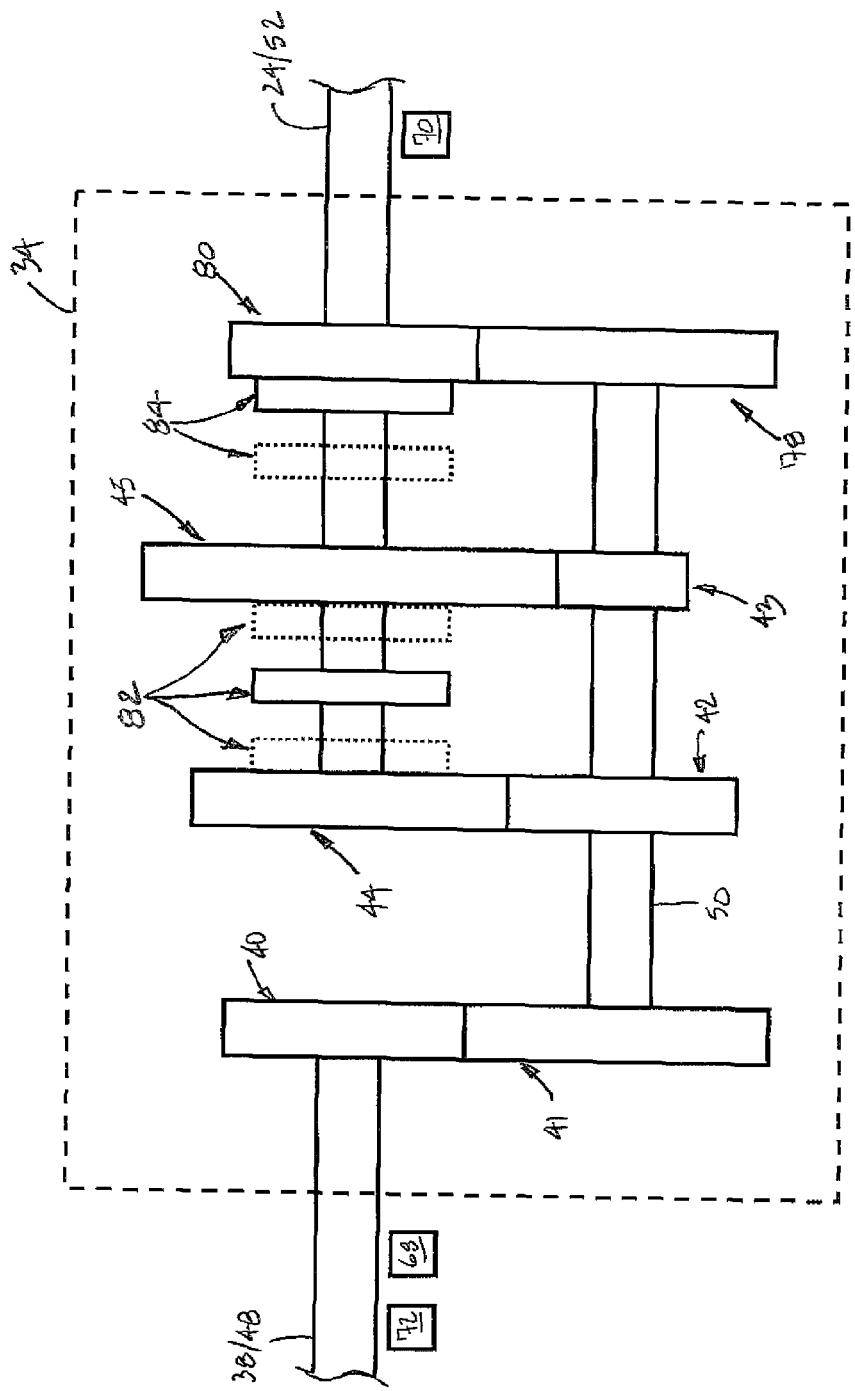
FIG. 6 is a block diagram of the sensors with an alternate embodiment transmission.

FIG. 5 is a flow diagram of a method for selectively powering the load 22 with the power system 20 of FIG. 1. This method is described below with reference to the transmission 34 and the control system 36 of FIGS. 1-4 for illustrative purposes. The present method, however, may also be performed using a transmission and/or a control system with configurations other than those described above. The transmission 34, for example, may have configurations as illustrated in FIGS. 6-8. One or more of the sensors 68, 70 and 72 of the control system 36 may be respectively arranged with the shafts 38 and/or 24, or various components of the motor 32 and/or the load 22. The controller 66 may determine the speeds of and/or torques applied to the transmission components from other related sensor data and/or data stored in the memory 74. The present method therefore is not limited to any particular power system or load types or configurations.

In step 500, the transmission 34 is configured in first gear (see FIG. 3) and transfers mechanical energy (e.g., torque) from the motor 32 to the load 22. The motor 32, for example, rotates to the shaft 38, which rotates the input shaft 48 and the gear 40. The gear 40 rotates the gear 41, which rotates the lay shaft 50 and the gears 42 and 43. The gear 42 rotates the gear 44, which rotates the gear 46 and the output shaft 52. The output shaft 52 rotates the shaft 24, which rotates the drive wheels 26 (see FIG. 1).

In step 502, the controller 66 receives a shift signal. This shift signal indicates the transmission 34 is to shift out of first gear (see FIG. 3) and into neutral (see FIG. 2). The shift signal may be generated based on an input from a human operator (e.g., a driver); e.g., shifting gears using a paddle shifter. Alternatively, the shift signal may be generated based on the operating state of the motor 32; e.g., when the motor 32 is rotating at or above a threshold.

In step 504, the controller 66 receives the torque data from the sensor system 64. As set forth above, the torque data may be indicative of the torques to which the input shaft 48 and, thus, the gear 44 and 46 are being subjected.

In step 506, the controller 66 signals the motor 32 to operate in a fashion that substantially unloads the meshed gears 44 and 46. The controller 66, for example, may operate in a feedback loop with the torque sensor 72 and the motor 32 to drive the torque being applied on the gears 44 and 46 to zero. More particularly, the controller 66 may signal the motor 32 to reduce its power output such that a tangential force between the meshing teeth 56 and 58 of the gears 44 and 46 is substantially zero.

In step 508, the controller 66 signals an actuator to slide the unloaded gear 46 from the first gear position (see FIG. 3) to the neutral position (see FIG. 2) using the shift linkage 62. In this manner, the actuator disengages the meshed and unloaded gears 44 and 46 from one another such that the transmission 34 no longer transfers mechanical energy from the motor 32 to the load 22. Of course, in other embodiments, a human operator may manually move the shift linkage 62 to change the position of the gear 46.

In step 510, the controller 66 receives speed data from the sensor system 64. This speed data may include the input speed data generated by the input speed sensor 68 and/or the output speed data generated by the output speed sensor 70. As set forth above, the input speed data may be indicative of the rotational and/or tangential speeds of the input shaft 48 and, thus, the gear 45. The output speed data may be indicative of the rotational and/or tangential speeds of the output shaft 52 and, thus, the gear 46.

In step 512, the controller 66 signals the motor 32 to operate in a fashion that synchronizes rotation of the gear 45 with rotation of the gear 46. The controller 66, for example, may operate in a feedback loop with the sensors 68 and 70 and the motor 32 to drive the rotational speed of the gear 45 to substantially match the rotational speed of the gear 46. Alternatively, referring to FIGS. 7 and 8, the controller 66 may operate the motor 32 to drive the tangential speed of the gear 42, 43 to substantially match the tangential speed of the gear 44, 45, respectively.

Referring again to FIGS. 1-5, in step 514, the controller 66 signals the actuator to slide the gear 46 from the neutral position (see FIG. 2) to the second gear position (see FIG. 4) using the shift linkage 62. In this manner, the actuator engages the synchronized gears 45 and 46 with one another such that the transmission 34 may resume the transfer of mechanical energy from the motor 32 to the load 22. Of course, in other embodiments, a human operator may manually move the shift linkage 62 to change the position of the gear 46.

Using the method of FIG. 5, the transmission 34 may relatively smoothly and/or quickly shift from first gear to neutral to second gear (or between other gears) without, for example, using a clutch or a torque converter to prevent or reduce damage to the gears 40-46; e.g., "grinding gears". For example, by disengaging the gears 44 and 46 from one another while unloaded, the risk of damaging the teeth 56 and 58 may be reduced. Similarly, by engaging the gears 45 and 46 with one another while synchronized, the risk of damaging the teeth 56 and 60 may further be reduced. This enables the power system 20 to be configured without a clutch or a torque converter, which may in turn reduce complexity, cost, weight and/or size of the power system 20. Of course, in other embodiments, the power system 20 may also be configured with a clutch and/or a torque converter.

FIG. 6 illustrates another exemplary embodiment of the transmission 34. In contrast to the transmission 34 of FIGS. 2-4, the transmission 34 of FIG. 6 further includes a plurality of additional gears 78 and 80. Each of these gears 78 and 80 may be configured as a spur gear or a helical gear as described above. The gear 78 is mounted on as well as rotatably and axially fixed to the lay shaft 50. The gear 80 is rotatably mounted on and axially fixed to the output shaft 52. One or more teeth of the gear 78 are meshed with one or more teeth of the gear 80. These gears 78 and 80 are respectively sized different than the gears 42-45 and thereby may provide the transmission 34 with another speed; e.g., a third speed.

In addition to the foregoing, the gear 46 of FIGS. 2-4 may be replaced with one or more rotors 82 and 84; e.g., clutch plates. Each of these rotors 82 and 84 may be configured as a collar that slides along and is rotatably fixed to the output shaft 52. The rotor 82 may slide in a first direction to (e.g., frictionally) engage with the gear 44 and rotatable fix the gear 44 to the output shaft 52. The rotor 82 may also slide in a second direction to (e.g., frictionally) engage with the gear 45 and rotatable fix the gear 45 to the output shaft 52. The rotor 84 may slide in the second direction to (e.g., frictionally) engage with the gear 80 and rotatable fix the gear 80 to the output shaft 52.

FIGS. 7 and 8 illustrate still another exemplary embodiment of the transmission 34. In contrast to the transmission 34 of FIGS. 2-4, the transmission 34 of FIGS. 7 and 8 is configured without the gear 46 and the rotors 82, 84 of FIG. 6. Each of the gears 44 and 45 is further rotatably fixed to the output shaft 52. In addition, the output shaft 52 is adapted to slide along its axis between the position of FIG. 7 and the position of FIG. 8. In this manner, a shift linkage 86 may slide the output shaft 52 to engage the gear 44 with the gear 42, or the gear 45 with the gear 43.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A method involving a transmission connected to a motor, the transmission including a first rotor, a second rotor and an output, the method comprising:
   operating the motor based on speed data to synchronize the first rotor with the second rotor, the speed data indicative of speeds of the first and the second rotors; and
   engaging the synchronized first and second rotors with one another to transfer torque from the motor to the output;
   the transmission being connected to the motor without a clutch; and
   the transmission being a manual transmission and including a shift linkage configured to actuate shifting of the transmission where the shift linkage is physically moved by an operator.

2. The method of claim 1, wherein the first rotor is synchronized with the second rotor by automatically operating the motor to substantially match a rotational speed of the first rotor with a rotational speed of the second rotor.

3. The method of claim 1, wherein the first rotor is synchronized with the second rotor by substantially matching a tangential speed of the first rotor with a tangential speed of the second rotor.

4. The method of claim 1, further comprising:
   operating the motor based on torque data to substantially unload the first rotor, the torque data indicative of a torque to which the first rotor is subjected; and
   disengaging the unloaded first rotor from the second rotor to decouple the motor from the output.

5. The method of claim 1, wherein the operation of the motor is controlled by a controller that receives the speed data from one or more speed sensors.

6. The method of claim 1, wherein the motor comprises an electric motor.

7. The method of claim 1, wherein the output is connected to a drive train of a vehicle.

8. The method of claim 1, wherein the transmission is connected to the motor without a torque converter.

9. The method of claim 1, further comprising actuating a clutch mechanism during the engagement of the first rotor with the second rotor, wherein the transmission includes the clutch mechanism.

10. The method of claim 1, wherein the output includes an output shaft, and the transmission further includes an input shaft and a lay shaft that couples the input shaft with the output shaft where the first rotor is engaged with the second rotor.

11. A method involving a transmission connected to an electric motor, the transmission including a first rotor, a second rotor and an output, the method comprising:
    operating the electric motor based on torque data to substantially unload the first rotor, wherein the torque data is indicative of a torque to which the first rotor is subjected, and the first rotor is engaged with the second rotor; and
    disengaging the unloaded first rotor from the second rotor to decouple the electric motor from the output;
    the transmission being connected to the electric motor without a clutch, the transmission being a manual transmission, and the transmission including a shift linkage configured to actuate shifting of the transmission where the shift linkage is physically moved by an operator; and
    the output being connected to a drive train of a vehicle.

12. The method of claim 11, wherein the first rotor is substantially unloaded by driving the torque substantially to zero.

13. The method of claim 11, further comprising:
    operating the electric motor based on speed data to synchronize a third rotor included in the transmission with the second rotor, the speed data indicative of speeds of the second and the third rotors; and
    engaging the synchronized second and third rotors with one another to transfer torque from the electric motor to the output.

14. The method of claim 11, further comprising:
    operating the electric motor based on speed data to synchronize third and fourth rotors included in the transmission, the speed data indicative of speeds of the third and the fourth rotors; and
    engaging the synchronized third and fourth rotors with one another to transfer torque from the electric motor to the output.

15. The method of claim 11, wherein the operation of the electric motor is controlled by a controller that receives the torque data from a sensor.

16. A vehicle system, comprising:
    an electric motor;
    a transmission connected to the electric motor, the transmission being a manual transmission and including a shift linkage, a first rotor, a second rotor and an output, and the shift linkage configured to actuate shifting of the transmission where the shift linkage is physically moved by an operator;
    a drive train connected to the electric motor through the transmission; and
    a controller adapted to control operation of the electric motor, based on speed data, to synchronize the first rotor with the second rotor such that the synchronized first and second rotors are operable to engage with one another and transfer torque from the electric motor to the output, wherein the speed data is indicative of speeds of the first and the second rotors;
    wherein the transmission is connected to the electric motor without a clutch.

17. A vehicle system, comprising:
    an electric motor;
    a transmission connected to the electric motor, the transmission being a manual transmission and including a shift linkage, a first rotor, a second rotor and an output, and the shift linkage configured to actuate shifting of the transmission where the shift linkage is physically moved by an operator;
    a drive train connected to the electric motor through the transmission; and
    a controller adapted to control operation of the electric motor, based on torque data, to substantially unload the first rotor such that the unloaded first rotor is operable to be disengaged from the second rotor and decouple the electric motor from the output, wherein the torque data is indicative of a torque to which the first rotor is subjected;
    wherein the transmission is connected to the electric motor without a clutch.

* * * * *